Figure 1:
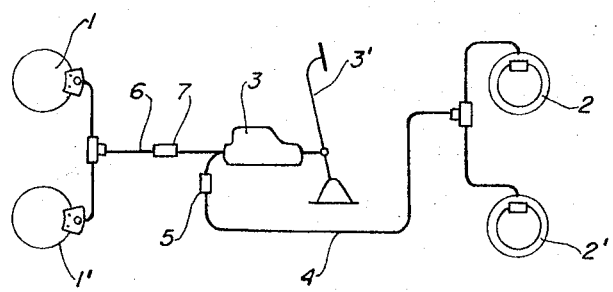

March 28, 1967     H. OBERTHÜR     3,311,422
FRONT AND REAR BRAKE PROPORTIONING SYSTEM
Filed Oct. 22, 1965

INVENTOR:
HEINRICH OBERTHUR
BY
Ross & Mestern

United States Patent Office 3,311,422
Patented Mar. 28, 1967

3,311,422
FRONT AND REAR BRAKE PROPORTIONING
SYSTEM
Heinrich Oberthür, Offenbach-Rumpenheim, Germany, assignor to Alfred Teves Maschinen- und Armaturenfabrik KG., a corporation of Germany
Filed Oct. 22, 1965, Ser. No. 501,005
Claims priority, application Germany, Mar. 27, 1965, T 28,271
2 Claims. (Cl. 303—6)

My present invention relates to a brake system for automotive vehicles and, more particularly, to a brake system having sets of brakes of different types and with different pressure responses.

It has already been proposed to provide an automotive brake system wherein different types of brakes are used in sets for the front and back wheels; thus the front wheels of the vehicle may be provided with disk brakes having a relatively high (fast) pressure response and capable of more rapid braking, while the rear wheels are provided with the more sluggish, so-called "drum-type" brakes of the internal-expanding or like construction. The term "disk brake" as used herein is intended to refer to a wheel brake in which a rotating element is provided with a braking disk having surfaces generally in a plane transverse to the axis of rotation and a pair of brake shoes mounted upon a yoke extending around the periphery of the disk and encompassing a segment thereof, the brake shoes being urged axially against the braking faces of the disk by fluid-responsive means which may include one or more cylinders carried by the yoke. By contrast, a drum-type brake device generally includes a brake drum mounted upon a rotatable portion of the wheel assembly and having a generally cylindrical braking surface. The brake shoes of this type of device extend along cylinder segments and are urged outwardly by respective pistons of a single hydraulic cylinder or a pair of such cylinders in back-to-back or connected in parallel to the brake line for supplying fluid under pressure to the device. Each piston generally bears against one end of the respective brake shoe while the other end is pivotally mounted on the brake shield or other support. Both types of brakes are described in the publication "Principles of Automotive Vehicles," U.S. Government Printing Office (1956).

An arrangement whereby disk-type brakes are provided for the front wheels of an automotive vehicle while drum-type brakes are provided for the rear wheels is able to take advantage of the better characteristics of both systems. Thus, only two disk-brake assemblies, which are more expensive although more efficient, are required and they are mounted upon the front wheels which necessitate the greater and more effective braking force. The drum-type brakes which can be equipped more readily with hand-brake controls are mounted on the rear-wheel assemblies since the locking action of the rear wheels is of greater value from the point of view of parking etc. It has been recognized that the use of different types of brakes as discussed above in automotive vehicles makes it necessary to provide some mechanism for insuring that the braking force is applied substantially simultaneously to the moving braking faces by the respective brake shoes because of the fact that less pressure is required to actuate the disk brakes than the drum brakes. The prior-art mechanism for insuring simultaneous operation of the brake devices consisted of carefully dimensioned tension springs assigned to each of the brake shoes and having one end connected to the brake shoe while the other end is connected to the brake support so as to apply greater force to the disk brake than to the drum brake whereby a higher fluid pressure will be required to overcome the spring force at the disk brake than is needed to overcome the springs of the drum-type brake. In general, however, this has not received widespread acceptance and is inconvenient because of the many springs required, dependency for the spring material to fatigue etc.

It is, therefore, the principal object of the present invention to provide an improved brake system having sets of brakes requiring different actuation pressures or having different pressure responses whereby simultaneity of operation is insured.

A further object of this invention is to provide an improved pressure-regulating device for a brake system of the character described which simply and with a minimum of moving parts capable of fatigue is able to maintain the proper relationship of actuation of the different types of brakes.

These objects and others which will become apparent hereinafter are attained, in accordance with the present invention, by providing in a brake system having disk-type and drum-type brakes connectable with a master cylinder, a pressure-responsive double-acting valve in the fluid-transmission line for the brake requiring the lower actuation pressure (operation threshold); the double-acting valve can include a check-valve assembly whose valve member is biased by relatively strong restoring means into a closed condition to block the flow of fluid to the set of brakes requiring the lower threshold pressure until the triggering pressure is attained whereupon the higher restoring force is overcome, while a check member held by a smaller restoring force readily opens to permit return flow of the fluid from this brake. The brake with the greater pressure response (lower operating threshold) in a system of the character described is, of course, the disk brake. I have found that best results are obtained when the double-acting check valve comprises a housing forming a valve passage within which a seat-forming membrane is displaceable against the force of a relatively strong spring by means of which it is held against a respective seat while the seat-forming member itself has a thoroughgoing passage cooperating with the check member (preferably a ball check) which can be substantially freely moved from the seat-forming member during return flow of the fluid.

Figure 2:
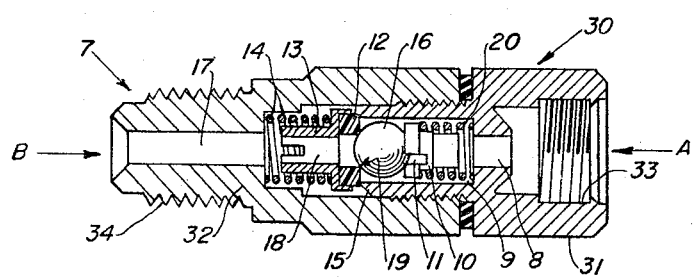

The above and other objects, features and advantages of the present invention will become more readily apparent from the following description, reference being made to the accompanying drawing, in which:

FIG. 1 is a diagrammatic view of an automotive brake system embodying the present invention; and FIG. 2 is an axial cross-sectional view through a control-valve assembly embodied in the system of FIG. 1 in accordance with the principles of the invention.

In FIG. 3 I show a brake system for an automotive vehicle in which the disk brakes 1 and 1' are connected in parallel and are mounted upon the vehicle chassis for braking the front wheels of the vehicle. This type brakes of disk character have a relatively high response to hydraulic pressure and thus have an actuation "threshold" of substantially 0.5 to 0.75 atmosphere (gauge) by contrast with the drum-type brakes 2, 2' energized in parallel and employed for the braking of the rear wheels of the vehicle. The drum-type brakes conventionally used for this purpose require pressure between substantially 3 and 5 atmospheres (gauge) for proper actuation so that, if both sets of brakes were energized from the common master cylinder 3 and the pressure in these lines rose progressively as force was applied to the brake pedal 3', the disk brakes should be energized early in the braking operation and well before the drum-type brakes. Under these circumstances, it is essential to provide some means for insuring simultaneous operation of the two different types of brakes in spite of that vastly different pressure-response characteristic. According to the invention, therefore, the hydraulic line 4 connecting the rearwheel brakes 2, 2' with the master cylinder 3 is provided with a pressure-responsive, pressure-retaining valve 5 which closes when the pressure behind this valve falls just below the response pressure (i.e. 3–5 atmosphere gauges) of the drum-type brakes 2, 2' and opens as the pressure delivered by the master cylinder 3 begins to exceed this value. A double-acting check valve 7 is, according to this invention, provided in the line 6 connecting the faster-acting brakes 1, 1' with the master cylinder. This double-acting check valve 7 is shown in detail in FIG. 2 and is designed to permit energization of the brakes 1, 1' only when the response threshold of the rear wheel brakes 2, 2' has been exceeded. Upon the termination of the braking operation, hydraulic fluid flows readily from the disk brakes 1, 1' through the valve 7 to the master cylinder and pressure at the rear wheel brakes above the characteristic blocking pressure of the relief valve 5 is also relieved.

The double-acting check valve 7 comprises a bipartite housing 30 consisting of a male member 31 threadedly received in a female member 32 and defining therewith a valve chamber 9 with which a passage 8 at the inlet side of the device communicates. A passage 8 opens into a port 33 adapted to receive a fitting for connecting the double-acting valve 7 with the master cylinder 3. Within this valve chamber 9, a support sleeve 10 is axially displaceable against a compression spring 20 and urges a ball 16 axially against a resilient seal or washer 12 of a seat-forming member 13. The latter is urged in the opposite axial direction by a compression spring 14 and normally bears against an annular seat 15 coaxially surrounding the ball 16 and formed by the projecting portion of the male member 31. An outlet passage 17 in a male fitting 34, connectable with the disk-brake line 6, leads from the valve chamber 9. The seat-forming member 13 is provided with an axial passage 18 registering with the ball seat 19 of the washer 12. The sleeve 10 against which the ball 16 rests, is provided with radial slots 11 for the throughflow of the hydraulic medium. The force of spring 14 is dimensioned to exceed that of spring 20 in the position of the device shown and the net force difference urging the seat-forming member 13 to the right determines the point at which, in the development of pressure in the master cylinder that hydraulic fluid flow to the disk brake 1, 1' will occur. This point can be adjusted by screwing the housing portions 31, 32 together to a greater or lesser extent, thereby controlling the degree of prestressing of the spring 14.

As hydraulic fluid builds up at the inlet 8, fluid pressure is applied to the ball 16 and the washer 12, urging the latter and its seat-forming member 13 to the left against the force of spring 14. When the pressure is sufficient to overcome the spring force, i.e. of a level above the response pressure of the drum-type brakes, the washer 12 is moved to the left and communication is established between the master cylinder and the disk brakes past the valve seat 15. Spring 20 holds the ball 16 against the washer during this movement in conjunction with the hydraulic pressure effective in this direction. When the brakes are released and the pressure falls at the master cylinder, the seat-forming member 13 returns to the right so that the washer 12 again engages the seat 15. The pressure on the brake side of the system is now sufficient to urge the ball 16 against the relatively weak spring 20 and thereby connect the wheel brakes to permit return flow of fluid without any significant hindering thereof.

The invention described and illustrated is believed to admit of many modifications within the ability of persons skilled in the art, all such modifications being considered within the spirit and scope of the appended claims.

I claim:

1. A brake system for automotive vehicles and the like having a set of disk brakes with relatively high pressure response and a set of drum-type brakes with relatively low pressure response; a master cylinder for supplying hydraulic fluid under pressure to both sets of brakes; and a double-acting check valve connected between said set of disk brakes and said master cylinder for blocking flow of hydraulic fluid to said set of disk brakes upon actuation of said master cylinder to supply hydraulic fluid to said set of drum-type brakes until the hydraulic-fluid pressure of said master cylinder attains a predetermined value, and thereafter communicating between said master cylinder and said set of disk brakes to actuate the latter, while permitting substantially unhindered return flow of hydraulic fluid from said set of disk-type brakes to said master cylinder upon deactivation of same, said double-acting check valve comprising a housing forming a valve passage, a seat-forming member displaceable in said passage and yieldably bearing against said housing with a relatively high force for blocking the flow of hydraulic fluid through said passage until the attainment of said predetermined pressure in said master cylinder, said seat-forming member having an opening and a check member biased against said seat-forming member with a relatively weak force and disengageable therefrom to unblock said opening for return flow of hydraulic fluid from the disk brakes to said cylinder; and a pressure-retaining valve connected between said drum-type brakes and said master cylinder for maintaining a hydraulic pressure in said drum-type brakes upon de-energization thereof at a level slightly below the response pressure of said drum-type brakes.

2. A brake system as defined in claim 1 wherein said seat-forming member is a sleeve provided with a washer and said check member is a ball engageable with said sleeve.

References Cited by the Examiner
UNITED STATES PATENTS 2,095,752  10/1937  La Brie _____ 137—493.9 X
3,245,221  4/1966  James et al. _____ 303—6 X

FOREIGN PATENTS 525,417  5/1956  Canada.
134,909  11/1919  Great Britain.

EUGENE G. BOTZ, *Primary Examiner.*